US012321538B2

(12) United States Patent
Ogata et al.

(10) Patent No.: US 12,321,538 B2
(45) Date of Patent: *Jun. 3, 2025

(54) ELECTRONIC PEN

(71) Applicant: Wacom Co., Ltd., Saitama (JP)

(72) Inventors: Mamoru Ogata, Saitama (JP); Kenichi Ninomiya, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/434,421

(22) Filed: Feb. 6, 2024

(65) Prior Publication Data
US 2024/0176433 A1    May 30, 2024

Related U.S. Application Data

(63) Continuation of application No. PCT/JP2022/026901, filed on Jul. 7, 2022.

(30) Foreign Application Priority Data

Aug. 13, 2021 (JP) ................. 2021-131919

(51) Int. Cl.
*G06F 3/0354* (2013.01)
*G06F 3/02* (2006.01)
*G06F 3/044* (2006.01)

(52) U.S. Cl.
CPC ........ *G06F 3/03545* (2013.01); *G06F 3/0202* (2013.01); *G06F 3/044* (2013.01)

(58) Field of Classification Search
CPC .... G06F 3/03545; G06F 3/0202; G06F 3/044; G06F 3/0383; G06F 3/03; G06F 3/0442; H01H 9/02
See application file for complete search history.

(56) References Cited

U.S. PATENT DOCUMENTS 5,258,592 A * 11/1993 Nishikawa ........... H01H 13/063
200/302.2
5,717,435 A * 2/1998 Fukushima ......... G06F 3/03545
345/179

(Continued)

FOREIGN PATENT DOCUMENTS

JP        H10301696 A      11/1998

OTHER PUBLICATIONS

English Translation of International Search Report dated Sep. 27, 2022, for the corresponding International Patent Application No. PCT/JP2022/026901, 2 pages.

*Primary Examiner* — Grant Sitta
(74) *Attorney, Agent, or Firm* — Seed IP Law Group LLP (57) ABSTRACT

Provided is an electronic pen including a housing that is cylindrical and configured to incorporate an electronic pen function part that includes a circuit board. The housing has a side opening formed on a side surface of the housing. The side opening is configured to accommodate a side switch. The electronic pens also includes a side attachment member configured to be attached to the side opening of the housing. A first axial end of the side attachment member includes an engagement part that engages with the housing, and a second axial end of the side attachment member includes a pressed part. The housing incorporates a pressing mechanism part that presses the pressed part of the side attachment member attached to the side opening, toward the first axial end of the side attachment member.

10 Claims, 5 Drawing Sheets

(56) References Cited

U.S. PATENT DOCUMENTS

| | | | | |
|---|---|---|---|---|
| 6,727,439 | B2* | 4/2004 | Chao | G06F 3/03545 |
| | | | | 345/179 |
| 9,691,570 | B1* | 6/2017 | Dinh | H01H 13/06 |
| 10,061,406 | B2* | 8/2018 | Arai | G06F 3/0383 |
| 10,423,246 | B2* | 9/2019 | Kim | G06F 3/038 |
| 10,691,209 | B2* | 6/2020 | Huizar | G06F 3/03545 |
| 10,990,198 | B2* | 4/2021 | Wong | G06F 3/04883 |
| 11,079,812 | B1* | 8/2021 | Bushnell | G06F 1/163 |
| 11,327,579 | B2* | 5/2022 | Ogata | G06F 3/03545 |
| 11,340,716 | B2* | 5/2022 | Marshall | G06F 3/0383 |
| 11,860,585 | B2* | 1/2024 | Crowley | G04G 17/08 |
| 11,880,514 | B2* | 1/2024 | Kanno | H03K 17/962 |
| 12,197,656 | B2* | 1/2025 | Ogata | H01H 9/02 |
| 2004/0252110 | A1* | 12/2004 | Defuans | G06F 3/03545 |
| | | | | 345/179 |
| 2014/0354604 | A1* | 12/2014 | Huang | G06F 3/03545 |
| | | | | 345/179 |
| 2017/0108954 | A1* | 4/2017 | Tang | G06F 3/03545 |
| 2017/0285775 | A1* | 10/2017 | Park | G06F 3/0383 |
| 2018/0081456 | A1* | 3/2018 | Li | G06F 3/0383 |
| 2018/0129322 | A1* | 5/2018 | Sah | H03K 17/955 |
| 2018/0267636 | A1* | 9/2018 | Chiu | G06F 3/03545 |
| 2018/0364823 | A1* | 12/2018 | Kamiyama | G06F 3/0383 |
| 2018/0366284 | A1* | 12/2018 | Hao | H01H 13/7073 |
| 2019/0179434 | A1* | 6/2019 | Tanaka | G06F 3/046 |
| 2020/0019257 | A1* | 1/2020 | Chang | G06F 3/03545 |
| 2022/0091648 | A1* | 3/2022 | Rolion | G06F 3/0442 |
| 2022/0113817 | A1* | 4/2022 | Gupta | G06F 3/03545 |
| 2022/0155878 | A1* | 5/2022 | Park | G06F 1/1698 |
| 2022/0384122 | A1* | 12/2022 | Shin | H01H 9/161 |
| 2024/0160302 | A1* | 5/2024 | Ninomiya | G06F 3/03545 |
| 2024/0176434 | A1* | 5/2024 | Ogata | G06F 3/03545 |

* cited by examiner

ELECTRONIC PEN

BACKGROUND

Technical Field

The present disclosure relates to an electronic pen that gives instructions of coordinates to a position detection apparatus incorporated in an electronic device such as a tablet personal computer (PC), thereby permitting information input.

Description of the Related Art

For example, some electronic devices such as tablet PCs or high-performing mobile phones terminal known as smartphones are configured to receive input of instructions from the electronic pen by means of their internal position detection apparatus so as to permit input of more detailed rendering. Some electronic pens for use with the electronic device allow the use of what is generally called a side switch. The side switch refers to a switch mounted on the side of the electronic pen in a manner operable by fingertips while the electronic pen is being held by a hand. As with a click button of what is generally called a mouse, which is a pointing device of the personal computer, the side switch when operated determines a pointed position or selects a function of opening and executing windows, among others.

In a case where an image is created using computer graphics (CG) technology, for example, the side switch is frequently used to operate an airbrush function or to change the selection of colors to be used, for instance. On the other hand, in the case of text input, for example, the side switch is less likely to be used. The side switch function of the electronic pen may then be seldom used even if the side switch function is provided, depending on the application to be executed. Under such circumstances, Japanese Patent Laid-open No. Hei 10-301696 (hereinafter, referred to as Patent Document 1) discloses an inventive position pointer (i.e., electronic pen) configured to have a side switch operation part removably attached as a unit to a main body of the position pointer. This configuration allows the side switch operation part to be attached or detached depending on the usage frequency of the side switch.

In the case of the above-cited Patent Document 1, the side switch operation part (side switch) is secured with screws to the main body of the position pointer. Whereas this structure permits secure attachment of the side switch, it takes time and effort to attach and detach the side switch. Further, in the case of the disclosure disclosed in the above Patent Document 1, the side switch is structured to protrude conspicuously from the main body in a direction intersecting with the axial direction of the position pointer. Whereas there exist users who prefer such a structure, there may well be users who like to have a side switch projected less prominently from the position pointer main body. Further, it is considered more convenient to easily replace one type of side switch operation part with some other more suitable type of side switch operation part depending on the mode of input by the electronic pen.

BRIEF SUMMARY

The present disclosure has been made in view of the above circumstances. An object of the disclosure is therefore to provide an electronic pen that permits flexible changing of the manner of use of the side switch function depending on the need of the user.

In solving the foregoing and other problems of the related art and according to one aspect of the invention, there is provided an electronic pen including a housing that is cylindrical and configured to incorporate an electronic pen function part that includes a circuit board. The housing has a side opening formed on a side surface of the housing. The side opening is configured to accommodate a side switch. A side attachment member configured to be attached to the side opening of the housing. A first axial end of the side attachment member includes an engagement part that engages with the housing, and a second axial end of the side attachment member includes a pressed part. The housing incorporates a pressing mechanism part that presses the pressed part of the side attachment member attached to the side opening toward the first axial end of the side attachment member.

With the above electronic pen, the side attachment member has the first axial end thereof provided with the engagement part and has the second axial end thereof provided with the pressed part. When the side attachment member is to be attached to the side opening of the housing, one end of the side attachment member is inserted obliquely into the side opening of the housing until abutting to one end of the side opening, and the other end of the side attachment member is pressed downward toward the side opening. This causes the engagement part at one end of the side attachment member to engage with the inner surface of the housing and allows the pressing mechanism part to press the pressed part at the other end of the side attachment member toward the one end thereof, thereby attaching the side attachment member to the side opening of the housing. In this manner, the side attachment member can be attached to the side opening of the housing by the simple action of inserting and pressing down the side attachment member in the side opening.

DETAILED DESCRIPTION

An embodiment of an electronic pen disclosed in the present disclosure is described below with reference to the accompanying drawings. Diverse types of electronic pens exist, including electromagnetic resonance (EMR) type electronic pens and active capacitance (AES) type electronic pens, for example. This disclosure can be applied to any type of electronic pen as long as it allows what is generally called a side switch to be attached thereto. For purpose of simplification, what is explained below as an example is the case where the disclosure is applied to the EMR type electronic pen.

External Appearances of Electronic Pen and Its Side Attachment Members

Figures 1A, 1B, 1C, 1D:
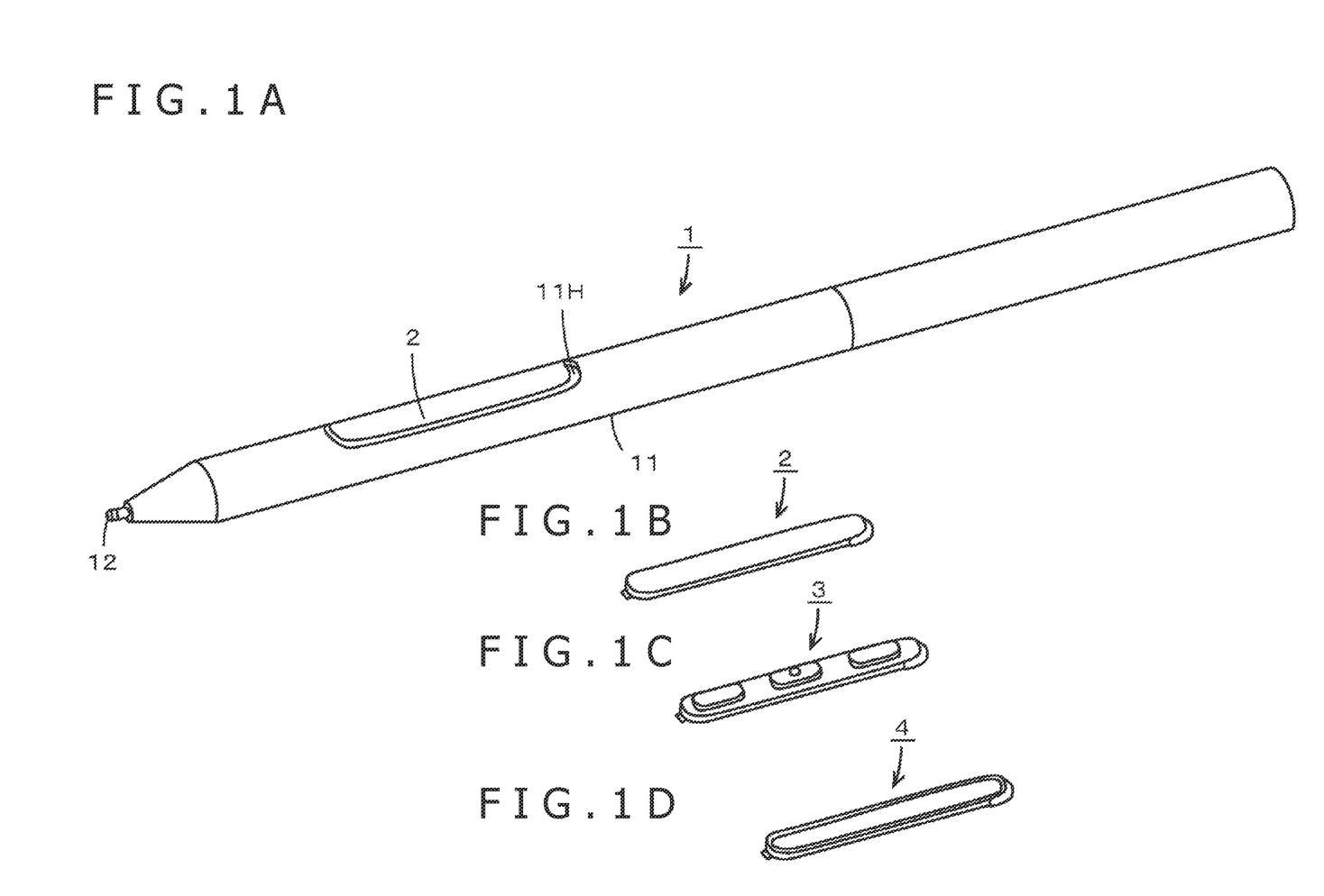
FIGS. 1A, 1B, 1C, and 1D are explanatory diagrams depicting external appearances of an electronic pen and side attachment members according to an embodiment of the present disclosure.

FIGS. 1A, 1B, 1C, and 1D are explanatory diagrams depicting external appearances of an electronic pen and side attachment members according to the embodiment of the present disclosure. As depicted in FIG. 1A, an electronic pen 1 has a cylindrical housing 11 tapered on the pen tip end that is open. Incorporated in the housing 11 is a stylus 12 of which the pen tip is projected from the tip opening of the housing 11. Also incorporated in the housing 11 is an electronic pen function part which implements electronic pen functions and which includes a ferrite core, a coil, a writing pressure detection part, and a circuit board, for example, to be discussed later in detail.

On the side surface of the pen tip end of the housing 11 is a side opening 11H as indicated in FIG. 1A. The side opening 11H is originally configured to accommodate a side switch (side switch operation part) for pressing switches mounted on the circuit board inside the housing 11. With the electronic pen 1 of this embodiment, the side opening 11H of the housing 11 can detachably accommodate multiple types of side attachment members. With this embodiment, as depicted in FIGS. 1B, 1C, and 1D, three types of side attachment members 2, 3, and 4 can be removably attached.

The side attachment member 2 indicated in FIG. 1B functions as a cap member capping the side opening 11H of the housing 11. In the description that follows, the side attachment member 2 will be referred to as a cap member 2. When the cap member 2 is attached to the side opening 11H, no operation can be performed on the switches mounted on the circuit board in the housing 11. That is, the side switch functions are disabled.

The side attachment member 3 indicated in FIG. 1C is a side switch formed of one or more pressing knobs (push-buttons) and a plate part to be fitted therewith. In the ensuing description, the side attachment member 3 will be referred to as a side switch 3. When the side switch 3 is attached to the side opening 11H, operations can be performed on the switches mounted on the circuit board in the housing 11. That is, the side switch functions are enabled.

The side attachment member 4 indicated in FIG. 1D is a touch sensor (touch sensor operation part) formed of a capacitance type or pressure-sensitive type touch sensor and a plate part to be fitted therewith. In the ensuing paragraphs, the side attachment member 4 will be referred to as a touch sensor 4. When the touch sensor 4 is attached to the side opening 11H, no operation can be performed on the switches mounted on the circuit board in the housing 11, but input operations may be carried out via the touch sensor of the touch sensor 4.

As described above, the three types of side attachment members 2, 3, and 4 can easily be attached and detached to and from the side opening 11H of the housing 11 of the electronic pen 1. This allows a user of the electronic pen 1 to suitably select the cap member 2, the side switch 3, or the touch sensor 4 in view of the desired manner of input using the electronic pen 1, before attaching what is selected thereto for use.

Exemplary Configurations of Side Attachment Members 2, 3, and 4

Figure 2A:
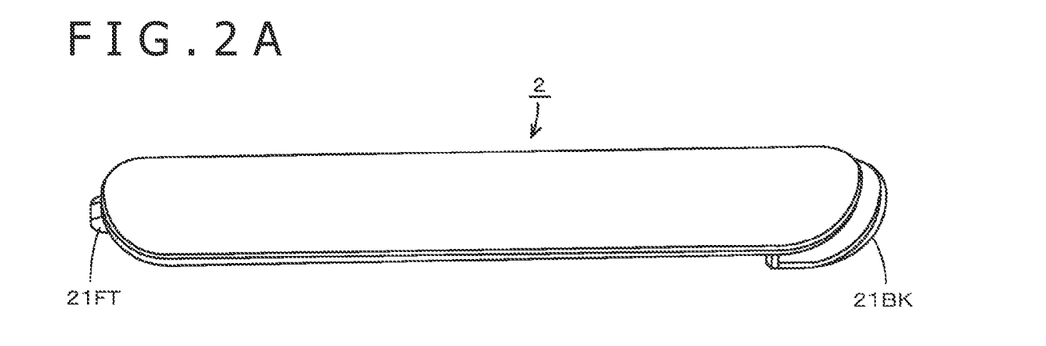
FIGS. 2A, 2B, and 2C are explanatory diagrams depicting exemplary configurations of the side attachment members of an embodiment of the present disclosure.
Figure 2B:
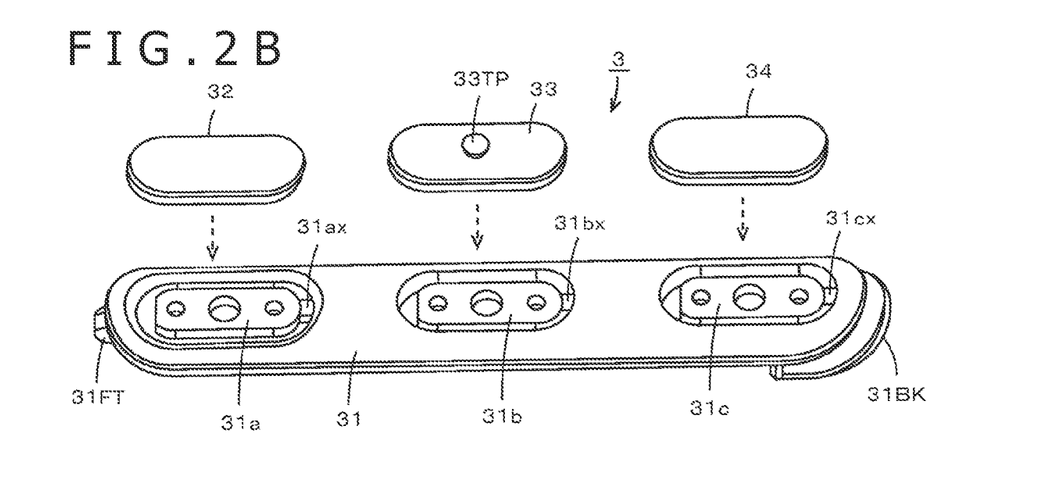
Figure 2C:
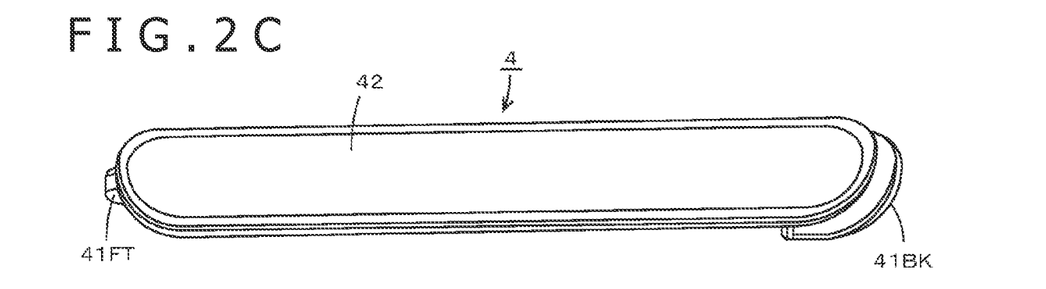

FIGS. 2A, 2B, and 2C are explanatory diagrams depicting exemplary configurations of the cap member 2, the side switch 3, and the touch sensor 4 as the side attachment members of the embodiment. As indicated in FIGS. 2A, 2B, and 2C, the cap member 2, the side switch 3, and the touch sensor 4 are similar in sizes (width, length, and thickness) and in outline. What makes the cap member 2, the side switch 3, and the touch sensor 4 different from each other is the presence or absence of functionality and, in a case where the member has functions, the types of the incorporated functions. What follows is an explanation of each of the cap member 2, the side switch 3, and the touch sensor 4.

Cap Member 2

FIG. 2A is an explanatory diagram depicting an exemplary configuration of the cap member 2. The cap member 2 may be formed as a single plate part constituted by a resin material, for example. The cap member 2 is used solely to cap the side opening 11H of the housing 11 and offers no other function. The resin material constituting the cap member 2 may be a polyacetal resin (POM), a polyamide (PA) resin, a polyethylene terephthalate (PET) resin, a polycarbonate (PC) resin, or an acrylonitrile butadiene styrene (ABS) resin, for example.

As indicated in FIG. 2A, the cap member 2 has substantially the same shape as that of the side opening 11H of the housing 11 of the electronic pen 1, and has a slightly smaller area than that of the side opening 11H. This allows the cap member 2 to fit into the side opening 11H. That is, the cap member 2 has a slightly narrower width (length in a direction perpendicular to the axial direction) and a slightly shorter total length (length in the axis direction) than those of the side opening 11H. When the cap member 2 is attached to the side opening 11H of the housing 11, the thickness of the cap member 2 is such that the top surface of the cap member 2 is substantially flush with the side surface of the housing 11.

As indicated in FIG. 2A, the cap member 2 has a semi-cylindrical engagement part 21FT projected toward the pen tip end near the pen tip bottom. The back end side surface of the cap member 2 constitutes a pressed part 21BK. The engagement part 21FT of the cap member 2 engages with an inner wall surface of the housing 11. The pressed part 21BK of the cap member 2 is pressed toward the pen tip end by a pressing mechanism part provided inside the housing 11, to be discussed later in detail.

The cap member 2 is attached to the side opening 11H by first inserting its pen tip end (engagement part 21FT side) obliquely into the side opening 11H of the housing 11 until abutting to the pen tip end of the side opening 11H and then by pressing down the back end of the cap member 2 (pressed part 21BK side) toward the side opening 11H. In this case, the cap member 2 is attached to the side opening 11H of the housing 11 with the engagement part 21FT engaging with the inner wall surface of the housing 11 and with the pressed part 21BK pressed toward the pen tip end (toward one end) by the pressing mechanism part provided inside the housing 11.

The pressed part 21BK on the back end of the cap member 2 is staggered in such a manner as to have the entire cap member 2 moved slidably backwards in a manner pushing the pressed part 21BK projected backward toward the back end of the housing 11. This allows the engagement part 21FT to disengage from the inner wall surface of the housing 11, permitting the cap member 2 to be detached from the side opening 11H of the housing 11. In this manner, the cap member 2 can be attached easily to the side opening 11H of the housing 11, secured sturdily thereto, and detached therefrom easily as needed.

Side Switch 3

FIG. 2B is an explanatory diagram depicting an exemplary configuration of the side switch 3. The side switch 3 includes a plate part 31 and three pressing knobs (operation buttons), i.e., a first pressing knob 32, a second pressing knob 33, and a third pressing knob 34, which are mounted on the plate part 31. The first pressing knob 32, the second pressing knob 33, and the third pressing knob 34 are each constituted of hard rubber, for example. The first pressing knob 32, the second pressing knob 33, and the third pressing knob 34 each have a substantially elliptical operation part of which the back side has a pressing projection in the middle (at the center) flanked front and back by attachment projections. It is to be noted that the pressing projection and the attachment projections are not indicated in FIG. 2B because they are mounted on the back sides of the pressing knobs 32, 33, and 34.

The surface (operation surface) of the second pressing knob 33 has an operation surface projection 33TP. Touching the operation surface projection 33TP of the second pressing knob 33 by fingertips allows the user to verify the position of the second pressing knob 33 as well as the presence of the other pressing knobs positioned front and back, without looking at the side switch 3. That is, the operation surface projection 33TP of the second pressing knob 33 enables the user to determine the positions of the pressing knobs 32, 33, and 34 by fingertips without looking at the side switch 3.

The plate part 31 is constituted of a metallic material or of any one of diverse resin materials as in the case of the above-described cap member 2. The plate part 31 has a first attachment part 31a, a second attachment part 31b, and a third attachment part 31c to which the first pressing knob 32, the second pressing knob 33, and the third pressing knob 34 are attached respectively. The first attachment part 31a, the second attachment part 31b, and the third attachment part 31c each have a pressing projection hole in the middle into which the pressing projection of the corresponding pressing knob is fitted, as indicated in FIG. 2B. The pressing projection hole at the center is flanked front and back by smaller attachment holes into which the attachment projections of the corresponding pressing knob are fitted. The first attachment part 31a, the second attachment part 31b, and the third attachment part 31c are each substantially rectangular in shape. When the first pressing knob 32, the second pressing knob 33, and the third pressing knob 34 are attached respectively to the first attachment part 31a, second attachment part 31b, and third attachment part 31c, the knobs are flush with the top surface of the plate part 31.

The first attachment part 31a is connected to the plate part 31 via a first support part 31ax on the back end (on the right in FIG. 2B), and the other parts are not in contact with the plate part 31. Likewise, the second attachment part 31b is connected to the plate part 31 via a second support part 31bx on the back end, and the other parts are not in contact with the plate part 31. Similarly, the third attachment part 31c is connected to the plate part 31 via a third support part 31cx on the back end, and the other parts are not in contact with the plate part 31. Consequently, when the first attachment part 31a, the second attachment part 31b, and the third attachment part 31c are each pressed from above, each of them is pressed downward with the first support part 31ax, the second support part 31bx, or the third support part 31cx acting as a supporting point.

As with the cap member 2 indicated in FIG. 2A, the plate part 31 in FIG. 2B has substantially the same shape as that of the side opening 11H of the housing 11 of the electronic pen 1, and has a slightly smaller area than that of the side opening 11H. This allows the plate part 31 to fit into the side opening 11H. That is, the plate part 31 has a slightly narrower width and a slightly shorter total length than those of the side opening 11H. In this embodiment, the thickness of the plate part 31 is such that, when the plate part 31 is attached to the side opening 11H of the housing 11, the top surface of the plate part 31 is substantially flush with the side surface of the housing 11.

As with the cap member 2 indicated in FIG. 2A, the plate part 31 in FIG. 2B has a semi-cylindrical engagement part 31FT projected toward the pen tip end near the pen tip bottom. The back end side surface of the plate part 31 constitutes a pressed part 31BK. The engagement part 31FT of the plate part 31 engages with the inner wall surface of the housing 11. The pressed part 31BK of the plate part 31 is pressed toward the pen tip end by the pressing mechanism part provided inside the housing 11, to be discussed later in detail.

Consequently, the side switch 3, which is formed with the first pressing knob 32, the second pressing knob 33, and the third pressing knob 34 mounted on the plate part 31, is attached to the side opening 11H of the housing 11 in substantially the same manner as that of the cap member 2. That is, the pen tip end (engagement part 31FT side) of the side switch 3 is inserted obliquely into the side opening 11H of the housing 11 until abutting to the pen tip end of the side opening 11H, and the back end of the side switch 3 (pressed part 31BK side) is pressed down toward the side opening 11H. The side switch 3 is thus attached to the side opening 11H of the housing 11 with the engagement part 31FT engaging with the inner wall surface of the housing 11 and with the pressed part 31BK pressed toward the pen tip end by the pressing mechanism part provided inside the housing 11.

As in the case of the cap member 2, the entire side switch 3 is moved slidably backwards by pushing the pressed part 31BK projected backwards, toward the back end of the housing 11. This allows the engagement part 31FT to disengage from the inner wall surface of the housing 11. In this manner, the side switch 3 is not only attached easily to the side opening 11H of the housing 11 but also detached therefrom easily as needed.

Touch Sensor 4

FIG. 2C is an explanatory diagram depicting an exemplary configuration of the touch sensor 4. The touch sensor 4 is formed with a touch sensor part 42 mounted on a plate part 41 constituted by a single plate made of various resins, for example. The touch sensor part 42 has sheet-like touch sensors covered with elastomer, as will be discussed later in detail. As with the above-described cap member 2, the plate part 41 may be formed using diverse resins.

The touch sensor 4 also has substantially the same shape as that of the cap member 2 indicated in FIG. 2A. The plate part 41 of the touch sensor 4 has a semi-cylindrical engagement part 41FT projected toward the pen tip end near the pen tip bottom. The back end side surface of the plate part 41 constitutes a pressed part 41BK. The engagement part 41FT of the touch sensor 4 engages with the inner wall surface of the housing 11. The pressed part 41BK of the touch sensor 4 is pressed toward the pen tip end by the pressing mechanism part provided inside the housing 11, to be discussed later in detail. These features are also similar to those of the above-described cap member 2.

The pen tip end (engagement part 41FT side) of the touch sensor 4 is thus inserted obliquely into the side opening 11H of the housing 11 until abutting to the pen tip end of the side opening 11H, and the back end of the touch sensor 4 (pressed part 41BK side) is pressed down toward the side opening 11H. The touch sensor 4 is thus attached to the side opening 11H of the housing 11 with the engagement part 41FT engaging with the inner wall surface of the housing 11 and with the pressed part 41BK pressed toward the pen tip end by the pressing mechanism part provided inside the housing 11.

As in the case of the cap member 2, the entire touch sensor 4 is moved slidably backwards by pushing the pressed part 41BK projected backwards, toward the back end of the housing 11. This allows the engagement part 41FT to disengage from the inner wall surface of the housing 11. In this manner, the touch sensor 4 is not only attached easily to the side opening 11H of the housing 11 but also detached therefrom easily as needed.

Figure 3A:
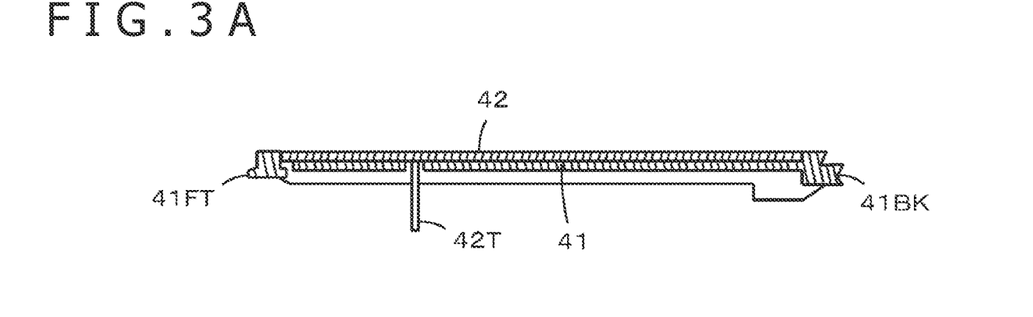
FIGS. 3A, 3B, 3C, and 3D are explanatory diagrams depicting an exemplary configuration of a touch sensor of an embodiment of the present disclosure.
Figure 3B:
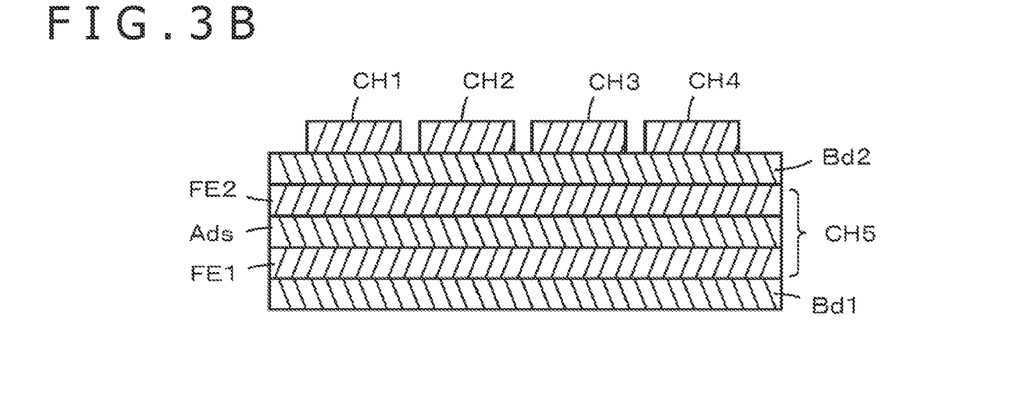
Figures 3C, 3D:
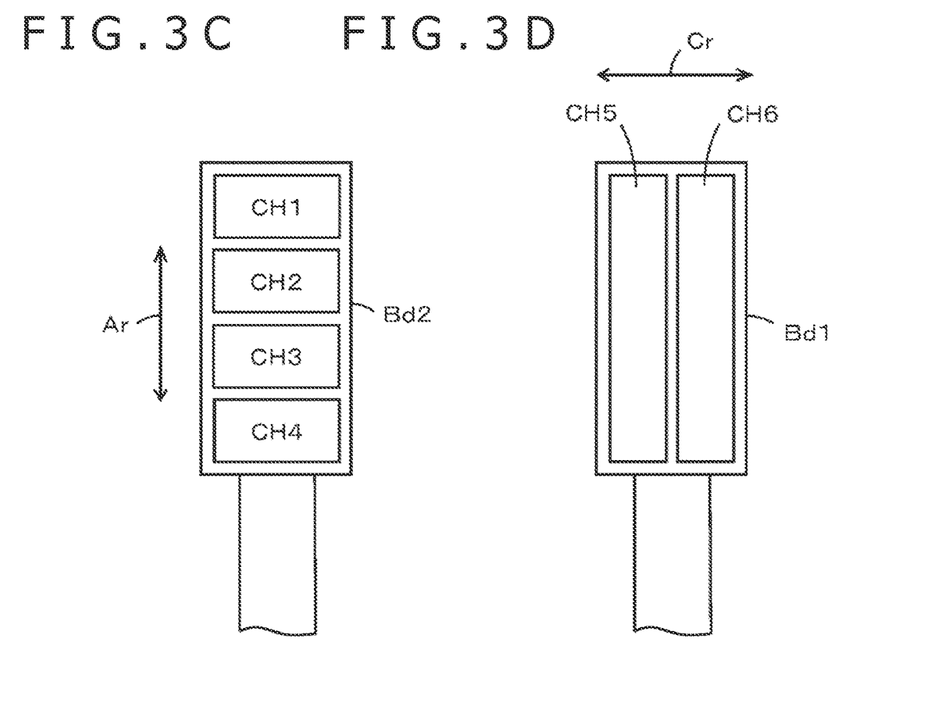

FIGS. 3A, 3B, 3C, and 3D are explanatory diagrams depicting an exemplary configuration of the touch sensor 4 of the embodiment. Of these drawings, FIG. 3A is a cross-sectional diagram of the touch sensor 4, and FIG. 3B is a cross-sectional diagram of the touch sensor part 42 of the touch sensor 4. FIGS. 3C and 3D depict exemplary arrangements of touch sensors operating on different detection principles. This embodiment has two types of touch sensors operating on a different detection principle each: pressure-sensitive (resistive touch system) sensors and capacitive sensors.

As discussed above and as indicated in FIG. 3A, the touch sensor 4 includes the touch sensor part 42 mounted on the plate part 41. A connection terminal 42T is led out of the touch sensor part 42. When the touch sensor 4 is attached to the side opening 11H of the housing 11, the connection terminal 42T is connected to a connection terminal provided on the circuit board inside the housing 11. The connection thus established allows the detection output from the touch sensor part 42 to be supplied to the circuit board.

The touch sensor part 42 includes a board Bd1, pressure-sensitive sensors CH5 and CH6, a board Bd2, and capacitive sensors CH1, CH2, CH3, and CH4 stacked in this order from below (from the plate part 41 side). The capacitive sensors CHI, CH2, CH3, and CH4 are arranged flush with one another on the same plane of the board Bd2 as depicted in FIG. 3B. That is, as indicated in FIGS. 3B and 3C, the capacitive sensors CH1, CH2, CH3, and CH4 are arranged in the axial direction of the electronic pen 1 (i.e., in the direction indicated by an arrow Ar in FIG. 3C). The capacitive sensors CH1, CH2, CH3, and CH4 are each capable of detecting a change in capacitance between a fingertip and a conductive film to determine whether or not an operation is performed. Simply bringing fingertips close to the sensors enables the latter to make the detection.

The pressure-sensitive sensors CH5 and CH6 are arranged in a direction intersecting with the axial direction of the electronic pen 1 (i.e., in the direction indicated by an arrow Cr in FIG. 3D). It is to be noted that FIG. 3B, which is a cross-sectional diagram as viewed from the front side of FIG. 3A, does not indicate the pressure-sensitive sensor CH6 positioned beyond the pressure-sensitive sensor CH5.

As indicated in FIG. 3B, the pressure-sensitive sensor CH5 includes a first electrode FE1 and a second electrode FE2 bonded together by an adhesive layer Ads. The pressure-sensitive sensor CH5 is capable of detecting whether or not pressure is applied when, with a voltage applied to one of the two opposing electrodes (resistive films), a pressing operation brings the two electrodes closer to each other to generate a voltage on the electrode currently free of voltage. Thus, unlike the capacitive sensors CH1, CH2, CH3, and CH4, the pressure-sensitive sensor CH5 provides detection output only when the pressure-sensitive sensor CH5 is given a certain amount of pressure and not when fingertips are simply brought close to it. The pressure-sensitive sensor CH6 is configured in a manner similar to that of the pressure-sensitive sensor CH5.

As described above, the capacitive sensors CH1, CH2, CH3, and CH4 permit the detection when the user's fingertips approach within a certain distance. The pressure-sensitive sensors CH5 and CH6, on the other hand, need to be given a certain amount of pressure to detect the pressing operation.

In this embodiment, the touch sensor 4 has the touch sensor part 42 including the board Bd1, the pressure-sensitive sensors CH5 and CH6, the board Bd2, and the capacitive sensors CH1, CH2, CH3, and CH4 stacked in this order as indicated in FIG. 3B. In this configuration, a gentle touch on the touch sensor part 42 causes only the capacitive sensors CH1, CH2, CH3, and CH4 to detect the touching operation. Applying at least a certain amount of pressure onto the touch sensor part 42, on the other hand, causes some of the capacitive sensors CH1, CH2, CH3, and CH4 being pressed and the pressure-sensitive sensor CH5 or CH6 underneath to simultaneously detect the pressing operation.

In this manner, the touch sensor 4 can accept input of slide operations that cause solely the capacitive sensors CH1, CH2, CH3, and CH4 of the touch sensor part 42 to function. The touch sensor 4 can also accept input of the pressing operations that cause the capacitive sensors CH1, CH2, CH3, and CH4 as well as the pressure-sensitive sensors CH5 and CH6 to function simultaneously. When the positions of the sensors detecting the input operations are taken into consideration, the touch sensor 4 can accept input of multiple different types of operations.

For example, a gentle touch on the touch sensor part 42 in the axial direction provides a slide or scroll operation causing the display screen to slide or scroll. Also, different types of touch sensors stacked vertically in the touch sensor part 42 may be used to implement front-back and left-right pressing operations, for example. That means that it is possible to distinguish two cases of operations: a case in which the capacitive sensors CH1 and CH2 and the pressure-sensitive sensors CH5 and CH6 are simultaneously operated, and a case in which the capacitive sensors CH3 and CH4 and the pressure-sensitive sensors CH5 and CH6 are simultaneously operated. It is also possible to distinguish another two cases of operations: a case in which the capacitive sensors CH2 and CH3 and the pressure-sensitive sensor CH5 are simultaneously operated, and a case in which the capacitive sensors CH2 and CH3 and the pressure-sensitive sensor CH6 are simultaneously operated.

The electronic pen 1 of this embodiment may be used with its cap member 2, side switch 3, and touch sensor 4 switched freely from one to another. Consequently, when making hand-written text input, for example, the user may attach the cap member 2 to the electronic pen 1 to disable the side switch functions. As another example, when creating images using CG technology, the user may attach the side switch 3 to the electronic pen I to make frequent use of the side switch functions, employing an airbrush function or changing line types and colors as often as desired for unrestrained rendering. As a further example, when editing documents, the user may attach the touch sensor 4 to the electronic pen 1 to cut out, move, add to, or otherwise manipulate sentences while scrolling the screen freely for smooth editing work.

Attachment and Detachment of Side Attachment Members to and From Electronic Pen

Figure 4A:
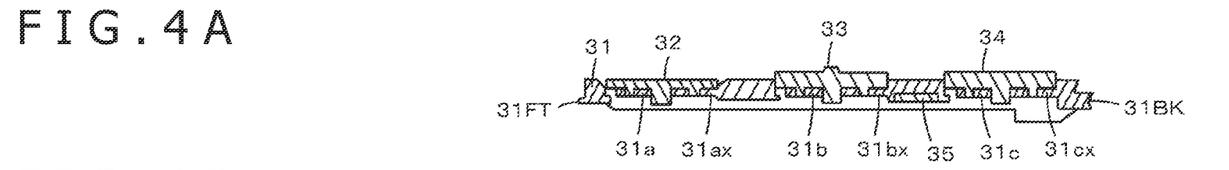
FIGS. 4A, 4B, and 4C are cross-sectional diagrams depicting a side switch as the side attachment member and the electronic pen according to an embodiment of the present disclosure.
Figure 4B:
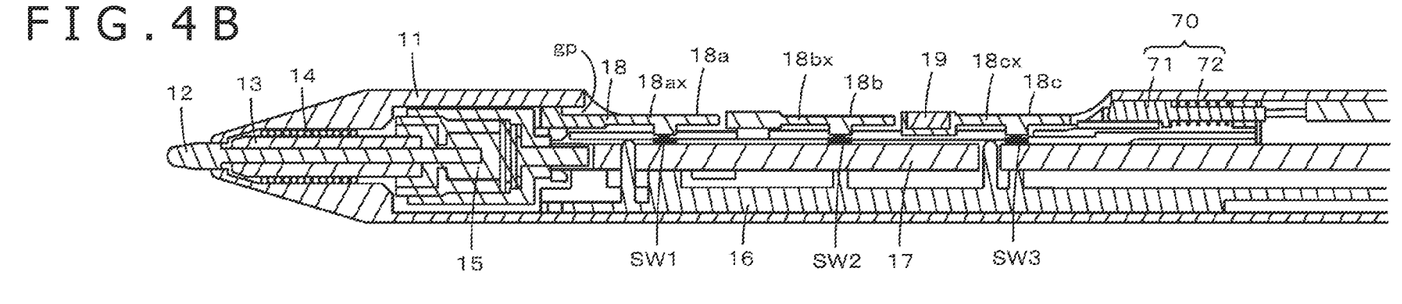
Figure 4C:
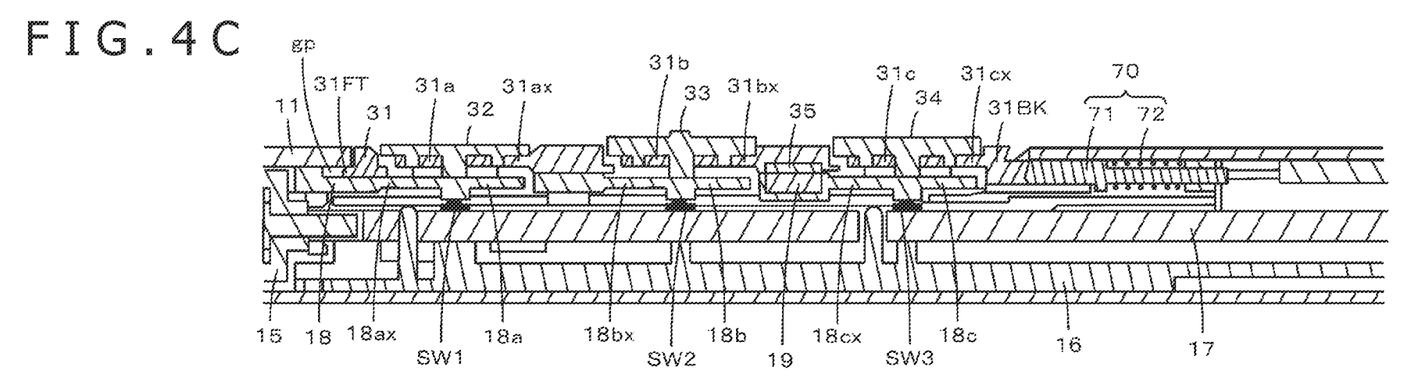

Explained below is the mechanism part for attaching and detaching the side attachment members 2, 3, and 4 to and from the side opening 11H of the housing 11 of the electronic pen 1. The ensuing explanation uses an example in which the side switch 3 is attached and detached as the side attachment member. The cap member 2 and the touch sensor 4 are also attached and detached in like manner to and from the side opening 11H of the housing 11 of the electronic pen 1. FIGS. 4A, 4B, and 4C are cross-sectional diagrams depicting the side switch 3 as the side attachment member and the electronic pen 1 according to the embodiment. Of these drawings, FIG. 4A is a cross-sectional diagram of the side switch 3 cut axially in half. As discussed above and as indicated in FIG. 4A, the side switch 3 includes the plate part 31, the first pressing knob 32, the second pressing knob 33, and the third pressing knob 34. The plate part 31 includes the first attachment part 31a, second attachment part 31b, and third attachment part 31c as depicted in FIG. 2B.

The side switch 3 includes the first pressing knob 32 attached to the first attachment part 31a, the second pressing knob 33 attached to the second attachment part 31b, and the third pressing knob 34 attached to the third attachment part 31c on the plate part 31. As indicated in FIG. 4A, the first through the third pressing knobs 32, 33, and 34 each have a pressing projection in the middle flanked front and back by attachment projections on the lower surface. These projections engage with the pressing projection hole in the middle and with the attachment holes flanking it front and back on the corresponding each of the first through the third attachment parts 31a, 31b, and 31c when the knobs are attached.

As explained above with reference to FIG. 2B, the first attachment part 31a is connected to the plate part 31 via the first support part 31ax, and the other parts are not connected with the plate part 31. The second attachment part 31b is connected to the plate part 31 via the second support part 31bx, and the other parts are not connected with the plate part 31. The third attachment part 31c is connected to the plate part 31 via the third support part 31cx, and the other parts are not connected with the plate part 31. In this structure, pressing down the first pressing knob 32 presses concomitantly the first attachment part 31a downward, pressing down the second pressing knob 33 presses concomitantly the second attachment part 31b downward, and pressing down the third pressing knob 34 presses concomitantly the third attachment part 31c downward.

In this embodiment, at least the first pressing knob 32 is less in thickness than the second pressing knob 33 and the third pressing knob 34. As described above, the surface of the operation part of the second pressing knob 33 id provided with the operation surface projection 33TP. The thicknesses of the pressing knobs 32, 33, and 34 along with the operation surface projection 33TP of the second pressing knob 33 allow the user to recognize the pressing knob currently in contact with his or her fingertips. This enables the user suitably to press the desired pressing knob 32, 33, or 34 without looking at the side switch 3. Alternatively, the pressing knobs 32, 33, and 34 may all be made different from each other in thickness or may be made identical to each other in thickness.

As explained above with reference to FIG. 2B and as indicated in FIG. 4A, the pen tip end of the plate part 31 is provided with the engagement part 31FT, and the back end thereof is furnished with the pressed part 31BK. Further, in the plate part 31, a metal sheet (metal piece) 35 is fixed between the second attachment part 31b and the third attachment part 31c. The metal sheet 35 functions, together with a magnet inside the housing 11 to be discussed later, as a positioning part that allows the side switch 3 to be positioned correctly relative to the housing 11 upon attachment to the side opening 11H of the housing 11. The metal sheet 35 also functions, in conjunction with the magnet inside the housing 11 to be discussed later, as a holding part that prevents the side switch 3 from getting detached inadvertently from the side opening 11H of the housing 11.

FIG. 4B is a cross-sectional diagram of the electronic pen 1 not equipped with the side switch 3 in the side opening 11H of the housing 11. This is a cross-sectional diagram of the electronic pen 1 that is cut axially in half and that ranges from the pen tip to the approximate middle thereof. The cross-sectional diagram of FIG. 4B thus depicts the pen tip up to the entire side opening 11H but omits the back end portion. As mentioned above, the housing 11 incorporates the electronic pen function part. Specifically, as indicated in FIG. 4B, the stylus 12 has its back end inserted into the housing 11 through an opening of the tapered pen tip end of the housing 11, before passing through a pipe-like ferrite core 13 and getting attached to a writing pressure detector 15. The side surface of the ferrite core 13 is wound with a coil 14 that constitutes a resonance circuit together with capacitors mounted on a circuit board 17, to be discussed later.

The stylus 12 projects from the opening at the tapered tip end of the housing 11. In keeping with the writing pressure applied to the pen tip, the stylus 12 moves slidably in the axial direction. That is, given a writing pressure, the stylus 12 is pushed into the housing 11 and moves toward the writing pressure detector 15. When relieved of the writing pressure, the stylus 12 is pushed back to its initial position. In this embodiment, the writing pressure detector 15 is configured as a variable capacitor. As such, the writing pressure detector 15 detects the writing pressure in response to the capacitance varying according to the writing pressure applied to the stylus 12.

Provided downstream of the writing pressure detector 15 is the circuit board 17 carrying diverse circuit components such as pressing switches SW1, SW2, and SW3, capacitors, and control integrated circuits (ICs) for implementing the side switch functions. The circuit board 17 is mounted on a half-pipe-shaped board holding member 16 of which the upper side facing the circuit board 17 is opened. The board holding member 16 thus secures the circuit board 17 in position inside the housing 11. That is, the board holding member 16 is fixed inside the housing 11. The upper side of the circuit board 17 is provided with a reverse hall-pipe-shaped board protection member 18 of which the lower side facing the circuit board 17 is opened. This structure protects the circuit board 17 against direct touch from the side opening 11H of the housing 11.

The board protection member 18 is provided with a first pressing part 18a positioned opposite to the first attachment part 31a of the plate part 31 of the side switch 3 being attached to the side opening 11H. Also in this configuration, the board protection member 18 is provided with a second pressing part 18b positioned opposite to the second attachment part 31b of the plate part 31 and with a third pressing part 18c positioned opposite to the third attachment part 31c of the plate part 31.

The lower side of the first pressing part 18a has a pressing projection that presses the switch SW1 of the circuit board 17. Likewise, the lower side of the second pressing part 18b has a pressing projection that presses the switch SW2 of the circuit board 17. Similarly, the lower side of the third pressing part 18c has a pressing projection that presses the switch SW3 of the circuit board 17. The first pressing part 18a of the board protection member 18 is connected to the board protection member 18 via a first support part 18ax, and the other parts are not connected with the board protection member 18. Likewise, the second pressing part 18b of the board protection member 18 is connected to the board protection member 18 via a second support part 18bx, and the other parts are not connected with the board protection member 18. Similarly, the third pressing part 18c of the board protection member 18 is connected to the board protection member 18 via a third support part 18cx, and the other parts are not connected with the board protection member 18.

A magnet 19 is fixed to a position on the pen tip end of the third support part 18cx. The magnet 19 attracts the above-mentioned metal sheet 35 of the side switch 3 and thereby functions as a positioning part for positioning the side switch 3. The magnet 19 also functions as a holding part that holds the side switch 3 in the side opening 11H.

Further, the upper side of the board protection member 18 on the back end is provided with a pressing mechanism part 70. The pressing mechanism part 70 includes a pressing member 71 and a coil spring 72, which is an elastic member. The pressing member 71 is positionally regulated not to be projected unnecessarily toward the pen tip end or pushed unnecessarily backward. The pressing member 71 is continuously pressed toward the pen tip end by the coil spring 72. When pressed toward the back end, the pressing member 71 moves slidably backwards with the coil spring 72 being contracted.

Figure 5:
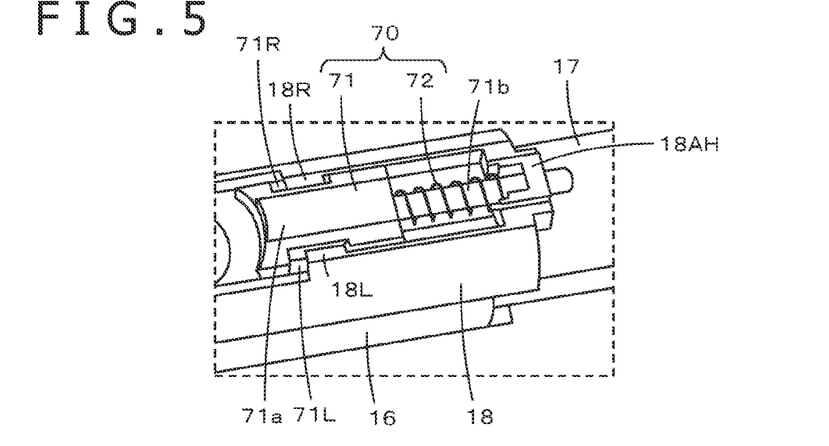
FIG. 5 is an explanatory diagram depicting a pressing mechanism part of the electronic pen according to an embodiment of the present disclosure.

FIG. 5 is an explanatory diagram depicting the pressing mechanism part 70 of the electronic pen 1 according to the embodiment. The back end portion of the board protection member 18 forms a placement recess in which the pressing member 71 and the coil spring 72 are placed. The pressing member 71 is constituted by a pressing plate part 71a and a rod-like part 71b. The pressing plate part 71a is a plate-like body with its tip face circularly recessed to fit with the pressed part 31BK on the back end of the side switch 3. The rod-like part 71b extends backwards from the middle of the back end face of the pressing plate part 71a. The rod-like part 71b is wound with the coil spring 72.

Recessed parts 71L and 71R are provided on the left and right side surfaces of the pressing plate part 71a. The left and right inner surfaces of the placement recess of the board protection member 18 has protruding parts 18L and 18R positioned corresponding to the left and right recessed parts 71L and 71R of the pressing plate part 71a of the pressing member 71 being placed in the placement recess of the board protection member 18. As indicated in FIG. 5, the pressing member 71 and the coil spring 72 are placed in the placement recess of the board protection member 18.

That is, the pressing member 71 is placed in the placement recess of the board protection member 18 in such a manner that the back end of the rod-like part 71b wound with the coil spring 72 is passed under an arched part 18AH at the back end of the board protection member 18. In this case, the protruding part 18L projected from the left inner surface of the placement recess of the board protection member 18 is inserted into the recessed part 71L on the left flank of the pressing plate part 71a, and the protruding part 18R projected from the right inner surface of the placement recess of the board protection member 18 is inserted into the recessed part 71R on the right flank of the pressing plate part 71a. In this manner, the pressing member 71 and the coil spring 72 are placed in the placement recess on the back end of the board protection member 18 with no possibility of detachment or misalignment.

The axial lengths of the recessed parts 71L and 71R of the pressing plate part 71a are greater than those of the protruding parts 18L and 18R of the board protection member 18. The lengths of the recessed parts 71L and 71R of the pressing plate part 71a in a direction intersecting with the axial direction thereof (i.e., depths of the recessed parts) are approximately the same as or slightly larger (deeper) than those of the protruding parts 18L and 18R of the board protection member 18 (i.e., lengths of the protruding parts). This structure allows the pressing member 71 to move slidably in the axial direction within the range restricted by the left and right protruding parts 18L and 18R of the board protection member 18. That is, the pressing member 71 is regulated not to be projected unnecessarily toward the pen tip or pushed unnecessarily backward.

As discussed above, the rod-like part 71b of the pressing member 71 is wound with the coil spring 72. The coil spring 72 is contracted between the back end face of the pressing plate part 71a and the back end inner wall surface of the placement recess of the board protection member 18 and continuously presses the pressing plate part 71a toward the pen tip. When the pressing plate part 71a is pressed backward, the coil spring 72 is contracted and can move slidably backwards within the range restricted by the left and right protruding parts 18L and 18R of the board protection member 18.

Consequently, upon attachment of the side switch 3, the pressing mechanism part 70 serves to fix the side switch 3 securely to the side opening 11H of the housing 11 and hold it in that state. Since the pressing member 71 can also be pressed backwards to be moved slidably, the side switch 3 can be detached easily as well.

FIG. 4C is a cross-sectional diagram of the electronic pen 1 with the side switch 3 attached to the side opening 11H of the housing 11. This is a cross-sectional diagram of the electronic pen 1 cut axially in half and enlarged centering on the side opening 11H. The pen tip end of the side switch 3 in FIG. 4A is positioned obliquely downward, the engagement part 31FT is inserted into a gap gp between the board protection member 18 and the housing 11 in FIG. 4B, and the back end of the side switch 3 is pressed toward the side opening 11H. These actions enable the side switch 3 to be attached to the side opening 11H of the electronic pen 1 as indicated in FIG. 4C.

In the case above, the engagement part 31FT of the side switch 3 engages with the inner wall surface of the housing 11 on the pen tip end of the side opening 11H. The pressed part 31BK at the back end of the side switch 3 is pressed toward the pen tip by the pressing member 71 of the pressing mechanism part 70 provided at the back end of the board protection member 18. Further, the metal sheet 35 of the side switch 3 is attracted by the magnet 19 of the board protection member 18. These three functions combine to secure the side switch 3 in an appropriate position in the side opening 11H of the housing 11 of the electronic pen 1 with no possibility of inadvertent detachment.

As described above, with the side switch 3 attached to the side opening 11H, pressing down the first pressing knob 32 of the side switch 3 performs a pressing operation on the switch SW1 of the circuit board 17 via the first pressing part 18a of the board protection member 18. Likewise, pressing down the second pressing knob 33 of the side switch 3 carries out a pressing operation on the switch SW2 of the circuit board 17 via the second pressing part 18b of the board protection member 18. Similarly, pressing down the third pressing knob 34 of the side switch 3 effects a pressing operation on the switch SW3 of the circuit board 17 via the third pressing part 18c of the board protection member 18.

When detaching the side switch 3 from the side opening 11H of the housing 11 of the electronic pen 1, the user touches the top surface of the side switch 3 with fingertips and pushes the side switch 3 upward toward the back end of the electronic pen 1. The push moves the side switch 3 slidably toward the back end of the electronic pen 1. This causes the side switch 3, along with the pressing member 71 of the pressing mechanism part 70, to move slidably toward the back end of the electronic pen 1. That in turn causes the engagement part 31FT on the pen tip end of the side switch 3 to disengage from the inner wall surface of the housing 11 on the pen tip end of the side opening 11H.

Consequently, the pen tip end of the side switch 3 is detached from the housing 11 of the electronic pen 1, which allows the pen tip end of the side switch 3 to be lifted. In this case, the metal sheet 35 of the side switch 3 is detached from the magnet 19 of the board protection member 18, and the pressure by the pressing member 71 of the pressing mechanism part 70 onto the pressed part 31BK of the side switch 3 is released. In this manner, the side switch 3 is detached easily from the side opening 11H.

Explained so far as an example is the case in which the side switch 3 is attached and detached to and from the side opening 11H of the housing 11 of the electronic pen 1. The cap member 2 and the touch sensor 4 as the side attachment members can also be attached and detached in like manner. That is, upon attachment, the cap member 2 or the touch sensor 4 is positioned obliquely on the pen tip end, and the engagement part 21FT or 41FT is inserted into the gap gp between the board protection member 18 and the housing 11 depicted in FIG. 4B. Further, the back end of the cap member 2 or the touch sensor 4 is pressed toward the side opening 11H. This allows the cap member 2 or the touch sensor 4 to be attached easily to the side opening 11H.

Upon detachment, the cap member 2 or the touch sensor 4 is pushed upward toward the back end of the electronic pen 1 for sliding movement to disengage the engagement part 21FT or 41FT from the inner wall surface of the housing 11. Thereafter, the pen tip end of the cap member 2 or the touch sensor 4 is lifted to release the pressure by the pressing member 71 of the pressing mechanism part 70 onto the pressed part 21BK or 41BK of the cap member 2 or the touch sensor 4. This allows the cap member 2 or the touch sensor 4 to be detached easily from the side opening 11H.

The cap member 2 or the touch sensor 4 may also have a metal sheet (metal piece) provided at a position similar to that of the metal sheet 35 of the side switch 3. In this case, the metal sheet is attracted by the magnet 19 of the board protection member 18 to attach the cap member 2 or the touch sensor 4 to an appropriate position in the side opening 11H. This allows the cap member 2 or the touch sensor 4 to be attached securely to the side opening 11H of the housing 11 with no possibility of inadvertent detachment.

Attachment of Grip Member

As indicated in FIG. 1A, the electronic pen 1 of this embodiment is a slim-body pen as a whole. Some users may instead want a wide-body pen grip on the electronic pen 1 they hold. The need may be met by an add-on wide-body grip member to be fitted to the electronic pen 1. In this case, it is problematic to attach the side attachment members such as the side switch. That is, simply making the side opening on the add-on grip member would make it difficult to properly use the side switch functions because of the increased thickness of the wide-body grip member. The side attachment members such as the side switch suitable for the add-on grip member are thus made available.

Figures 6A, 6B, 6C:
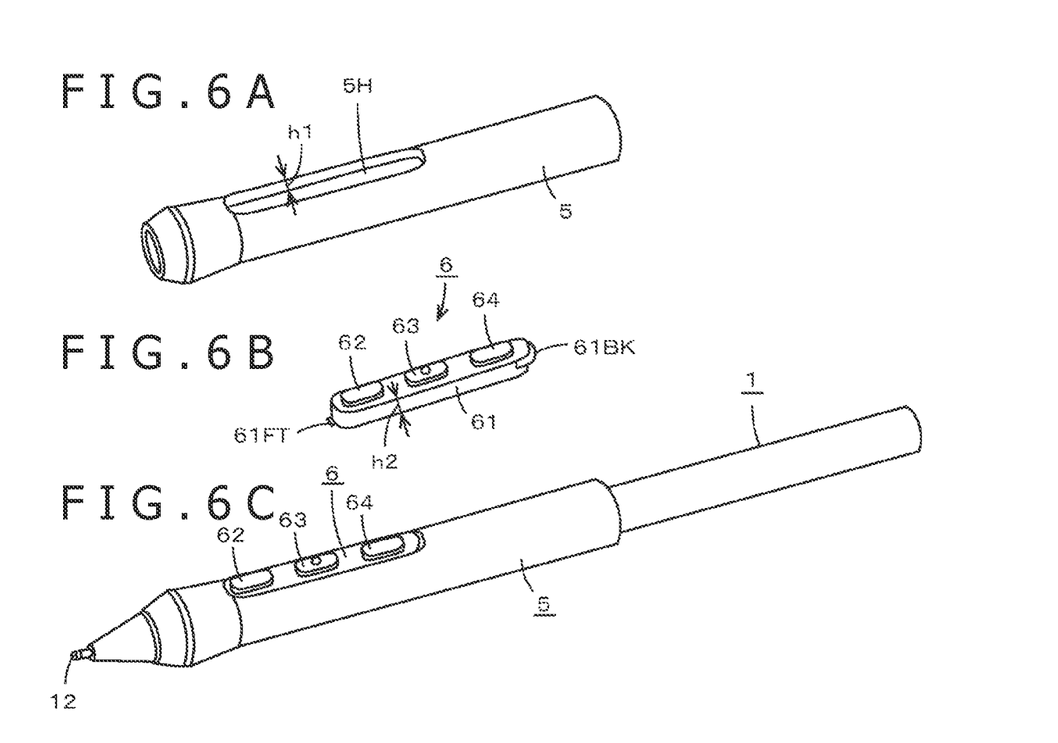
FIGS. 6A, 6B, and 6C are explanatory diagrams depicting a grip member attachable to the electronic pen of the embodiment along with an exemplary side attachment member that is usable when the grip member is attached.

FIGS. 6A, 6B, and 6C are explanatory diagrams depicting a grip member 5 attachable to the electronic pen 1 of the embodiment along with an exemplary side attachment member 6 that is usable when the grip member 5 is attached to the electronic pen 1. The side attachment member 6 indicated in FIGS. 6B and 6C is an exemplary side switch. As depicted in FIG. 6A, the add-on grip member 5 has a cylindrical body with its front and back ends left open. A side opening 5H is provided on the grip member 5 in such a manner that, when the grip member 5 is attached to the electronic pen 1, the side opening 5H coincides with the side opening 11H of the housing 11 of the electronic pen 1. The thickness of the grip member 5 in a direction intersecting with the axial direction thereof is h1 as indicated in FIG. 6A. That means that the main body of the electronic pen 1 is made wider by the thickness 1h.

A side switch 6 for combined use with the grip member 5 is configured in a manner basically similar to the side switch 3 discussed above with reference to FIGS. 2B and 4A. The side switch 6 thus includes a plate part 61, a first pressing knob 62, a second pressing knob 63, and a third pressing knob 64 as indicated in FIG. 6B. The front end face bottom of the side switch 6 is provided with an engagement part 61FT corresponding to the engagement part 31FT of the side switch 3. The back end face bottom of the side switch 6 constitutes a pressed part 61BK corresponding to the pressed part 31BK of the side switch 3. The thickness of the plate part 61 (i.e., thickness in a direction intersecting with the axial direction) is made up of the thickness of the housing 11 of the electronic pen 1 plus the thickness h1 of the grip member 5.

The plate part 61 of this example is also configured in a manner similar to that of the plate part 31 indicated in FIG. 2B. That is, the plate part 61 includes a first attachment part, a second attachment part, and a third attachment part, which are not depicted. Also in this example, the first attachment part is connected to the plate part 61 via a first support part, the second attachment part is connected to the plate part 61 via a second support part, and the third attachment part is connected to the plate part 61 via a third support part. The first attachment part, the second attachment part, and the third attachment part are not connected to the plate part 61 except for their portions connected via the first support part 6, the second support part, and the third support part. The thicknesses of the first attachment part, the second attachment part, and the third attachment part are basically the same as those of the first attachment part 31a, the second attachment part 31b, and the third attachment part 31c indicated in FIG. 2B.

At least a pressing projection provided at the lower surface center portion of each of the first pressing knob 62, the second pressing knob 63, and the third pressing knob 64 has a length corresponding to a thickness h2 of the plate part 61. Suppose that, as indicated in FIG. 6C, the grip member 5 is attached to the electronic pen 1 to let the side opening 5H of the grip member 5 coincide with the side opening 11H of the housing 11 and that the side switch 6 is attached to the electronic pen 1. In this case, the pressing projections provided at the lower surface center portions of the first pressing knob 62, the second pressing knob 63, and the third pressing knob 64 of the side switch 6 come into contact with the center portions of the first pressing part 18a, the second pressing part 18b, and the third pressing part 18c of the board protection member 18 in the manner depicted in FIG. 4C.

Consequently, when the grip member 5 is attached to the electronic pen 1 and the side switch 6 is further attached thereto, it is possible to implement an electronic pen that is equipped with a wide-body pen grip and that offers the side switch functions with no problem. It is to be noted that the grip member 5 is not limited to what is depicted in FIG. 5. Alternatively, the grip members of diverse designs attachable to the main body of the electronic pen 1 may be adopted. The grip member 5 may be formed by diverse types of elastomers, i.e., clastic macromolecular materials such as natural or synthetic rubber, or by other various materials including metals, woods, and hard resins.

The side attachment members have been discussed above with use of the side switch 6 as the example. It is to be noted that the cap member and the touch sensor, like the side switch 6, can also include an increased thickness in the direction intersecting with the axial direction. In such a case, the cap member and the touch sensor can be configured in a manner accommodating the add-on grip member 5. Still, when an add-on grip member with no side opening is fabricated and attached to the electronic pen 1, the side switch functions are disabled as in the case where the cap member 2 is attached.

Advantageous Effects of Embodiment

The electronic pen 1 of the above-described embodiment allows the manner of use of its side switch functions to be changed flexibly according to the user's needs. That is, the cap member 2, the side switch 3, and the touch sensor 4 serving as the side attachment members may be attached and detached freely, simply, and appropriately to and from the side opening 11H of the housing 11. Thus, even with the side switch functions incorporated, attaching the cap member 2 to the side opening 11H of the housing 11 makes the side switch functions unusable. Attaching the side switch 3 makes the push-activated side switch functions usable. Attaching the touch sensor 4 allows instructions to be input through the touch sensors of the touch sensor 4.

When the grip member 5 is attached so as to change the body width of the electronic pen 1, the manner of use of the side switch functions may be changed just as flexibly as in the case where the grip member 5 is not attached.

Variations

With the above-described embodiment, it has been explained that the side switch 3 has three pressing knobs 32, 33, and 34 and that the side switch 6 has three pressing knobs 62, 63, and 64. Alternatively, the number of pressing knobs in the side switch can be varied as long the knobs are operable, such as one or two pressing knobs included in the side switch. In this case, the circuit board 17 of the electronic pen 1 may be provided with the switches corresponding to the number of pressing knobs in the side switch. As another alternative, only one or two of the three switches SW1, SW2, and SW3 may be put to use.

The touch sensor 4 may be provided only with capacitive sensors or solely with pressure-sensitive sensors. In such a case, the touch sensors may be diversely arranged. Obviously, when the capacitive and pressure-sensitive sensors are used in combination, the touch sensors may be arranged or stacked in diverse ways.

The cap member 2, the side switches 3 and 6, and the touch sensor 4 may be varied in size to accommodate the size of the side opening 11H of the housing 11 of the electronic pen 1.

In the above-described embodiment, the side switch 3 is provided with the operation surface projection 33TP on the operation surface of the second pressing knob 33. Alternatively, the operation surface projection 33TP may be omitted or may be formed on the operation surface of another pressing knob.

In the above-described embodiment, the side switch 3 is provided with the metal sheet 35, and the board protection member 18 is equipped with the magnet 19 at the position corresponding to the metal sheet 35. Alternatively, the side switch 3 may be provided with multiple metal sheets, and the board protection member 18 may be equipped with magnets at positions corresponding to the multiple metal sheets of the side switch 3.

Since the plate part 31 or 61 of the side switch 3 or 6 may be formed of diverse metal materials, the plate part may be changed in weight depending on the type of metal material in use. In a case where the electronic pen 1 with what is generally called a low center of gravity is desired to be implemented, the side switch 3 for use therewith may include the plate part 31 formed of a heavy metal material. In a case where it is desired to implement an electronic pen that is lightweight as a whole, the electronic pen may use the side switch 3 with its plate part 31 formed of a light metal material.

Since the side attachment members such as the cap member 2, the side switch 3, and the touch sensor 4 can be attached and detached freely, simply, and appropriately, these features may be utilized in adding new functions. For example, when the electronic pen 1 is an active capacitance type electronic pen, the electronic pen 1 needs power to drive an oscillator that emits signals from the stylus. In this case, a battery included in the electronic pen 1 may be charged via an internal charging terminal made available for connection by detaching the side attachment member to expose the inside of the housing 11.

In the case of the side switch 3 in the above-described embodiment, for example, the engagement part 31FT is provided at the pen tip end, and the pressed part 31BK is provided at the back end. Alternatively, in a reverse configuration, the pressed part may be provided at the pen tip end of the side switch 3, and the engagement part may be provided at the back end thereof. In this case, the pen tip end of the board protection member 18 may be equipped with the pressing mechanism part 70 to press the side attachment member from the pen tip end toward the back end. The cap member 2, the touch sensor 4, and the side switch 6 may also be configured in like manner.

It is to be noted that the embodiment of the present disclosure is not limited to the foregoing embodiment, and that various changes can be made without departing from the spirit of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An electronic pen, comprising:
    a housing that is cylindrical and configured to incorporate an electronic pen function part that includes a circuit board,
    wherein the housing has a side opening formed on a side surface of the housing, and
    wherein the side opening is configured to accommodate a side switch; and
    a side attachment member configured to be attached to the side opening of the housing,
    wherein a first axial end of the side attachment member includes an engagement part that engages with the housing, and a second axial end of the side attachment member includes a pressed part,
    wherein the housing incorporates a pressing mechanism part that presses the pressed part of the side attachment member attached to the side opening toward the first axial end of the side attachment member,
    wherein the side attachment member includes at least two pressing knobs and a plate part fitted with the at least two pressing knobs,
    wherein one of the at least two pressing knobs has an operation surface including a projection that makes each of the at least two pressing knobs positionally identifiable, and
    wherein operating a desired one of the at least two pressing knobs operates a desired switch provided on the circuit board.

2. The electronic pen according to claim 1,
    wherein the pressing mechanism part is inside of the housing and includes a pressing member and an elastic member,
    wherein the pressing member presses the pressed part of the side attachment member, and
    wherein the elastic member pushes the pressing member toward the first axial end of the side attachment member.

3. The electronic pen according to claim 1,
    wherein the side attachment member is a cap member that caps the side opening of the housing.

4. The electronic pen according to claim 1,
    wherein respective thicknesses of at least two of the at least two pressing knobs are different to make each of the at least two pressing knobs positionally identifiable, and
    wherein operating a desired one of the at least two pressing knobs operates a desired switch provided on the circuit board.

5. The electronic pen according to claim 1,
    wherein at least one magnet is fixed in the housing within an area opposite the side opening of the housing, and
    wherein, when the side attachment member is attached to the side opening of the housing, the side attachment member has a metal member fixed at a position of the side attachment member opposite the magnet.

6. The electronic pen according to claim 1,
    wherein at least one metal member is fixed in the housing has within an area opposite the side opening of the housing, and
    wherein, when the side attachment member is attached to the side opening of the housing, the side attachment member has a magnet fixed at a position of the side attachment member opposite the metal member.

7. The electronic pen according to claim 1, further comprising:
    a cylindrical grip member configured to be attached to the housing,
    wherein the grip member has a grip opening at a position of the grip member that corresponds to the side opening of the housing when the grip member is attached to the housing, and
    wherein, when the side attachment member is used with the grip member attached to the housing, the side attachment member has a thickness enlarged in a direction intersecting with an axial direction the side attachment member by an amount of a thickness of the grip member.

8. An electronic pen, comprising:
    a housing that is cylindrical and configured to incorporate an electronic pen function part that includes a circuit board,
    wherein the housing has a side opening formed on a side surface of the housing, and
    wherein the side opening is configured to accommodate a side switch; and
    a side attachment member configured to be attached to the side opening of the housing,
    wherein a first axial end of the side attachment member includes an engagement part that engages with the housing, and a second axial end of the side attachment member includes a pressed part,
    wherein the housing incorporates a pressing mechanism part that presses the pressed part of the side attachment member attached to the side opening toward the first axial end of the side attachment member,
    wherein the side attachment member includes a touch sensor part and a plate part fitted with the touch sensor part,
    wherein the touch sensor part includes at least one capacitive touch sensor, and
    wherein operation of the at least one capacitive touch sensor of the touch sensor part enables operation input.

9. The electronic pen according to claim 8,
    wherein the touch sensor part includes at least one pressure-sensitive touch sensor, and
    wherein operation of the at least one pressure-sensitive touch sensor of the touch sensor part enables operation input.

10. The electronic pen according to claim 8,
    wherein the touch sensor part has two types of touch sensors that operate on different detection principles and that are stacked such that respective sensor regions of the touch sensors overlap, and
    wherein a touch operation performed on the two types of touch sensors in the touch sensor part enables operation input.

* * * * *